US007587272B2

(12) United States Patent
Bitar et al.

(10) Patent No.: US 7,587,272 B2
(45) Date of Patent: Sep. 8, 2009

(54) METHOD FOR LOCATING DIFFICULT ACCESS POINTS ON A MAP

(75) Inventors: Elias Bitar, Toulouse (FR); Nicolas Marty, Saint Sauveur (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/593,404

(22) PCT Filed: Feb. 23, 2005

(86) PCT No.: PCT/EP2005/050770

§ 371 (c)(1),
(2), (4) Date: Sep. 19, 2006

(87) PCT Pub. No.: WO2005/100912

PCT Pub. Date: Oct. 27, 2005

(65) Prior Publication Data

US 2007/0150121 A1 Jun. 28, 2007

(51) Int. Cl.
*G06K 17/00* (2006.01)
*G01C 21/20* (2006.01)

(52) U.S. Cl. ....................... 701/201; 701/208; 701/301; 701/3; 702/5; 382/199; 382/283; 382/106

(58) Field of Classification Search ..................... 702/5; 701/5

See application file for complete search history.

(56) References Cited

U.S. PATENT DOCUMENTS 5,086,396 A * 2/1992 Waruszewski, Jr. ......... 701/221
5,173,946 A * 12/1992 Rao .......................... 382/199
5,444,618 A * 8/1995 Seki et al. ...................... 702/5
5,504,686 A * 4/1996 Lippitt et al. ............... 701/201
5,839,090 A * 11/1998 Zoraster ........................ 702/5
7,120,540 B2 * 10/2006 Meunier ..................... 701/301

(Continued)

FOREIGN PATENT DOCUMENTS

EP 1065470 A1 * 1/2001

(Continued)

OTHER PUBLICATIONS

Borgrfors, Gunilla "Distance Transformations in Digital Images", Computer Vision, Graphics and Image Processing 34, 344-371 (1986).*

(Continued)

*Primary Examiner*—Thomas G Black
*Assistant Examiner*—Lin B Olsen
(74) *Attorney, Agent, or Firm*—Lowe Hauptman Ham & Berner, LLP

(57) ABSTRACT

A method of locating difficult access points on a topological map includes: analyzing curvilinear distances using a chamfer mask to catalogue approximate values C(V) of the Euclidean distances separating a point $C_{00}$ of the map from its nearest neighbors V; determining therefrom, at each point $C_{00}$ of the map of curvilinear distances, the discrepancies $|DT(V)-DT(\mathbf{0})|$ of curvilinear distances separating the point considered $C_{00}$ from its nearest neighbors V; comparing these discrepancies with the approximate values C(V); determining the point as a difficult access point based upon a difference between the Euclidean distance and the determined discrepancies of curvilinear distances; and rendering a display of a map indicating difficult to access points.

6 Claims, 6 Drawing Sheets

U.S. PATENT DOCUMENTS

| | | | | |
|---|---|---|---|---|
| 7,233,859 | B2 * | 6/2007 | Lundberg | 701/200 |
| 2003/0107499 | A1 | 6/2003 | Lepere et al. | |
| 2006/0077092 | A1 * | 4/2006 | Gilliland et al. | 342/26 B |
| 2006/0184327 | A1 * | 8/2006 | Moscovitz et al. | 702/5 |
| 2007/0027588 | A1 * | 2/2007 | Astruc et al. | 701/3 |
| 2007/0031007 | A1 * | 2/2007 | Bitar | 382/106 |
| 2007/0053609 | A1 * | 3/2007 | Bitar et al. | 382/283 |
| 2007/0265776 | A1 * | 11/2007 | Meunier et al. | 701/301 |

FOREIGN PATENT DOCUMENTS

| | | |
|---|---|---|
| FR | 2773609 A | 7/1999 |

OTHER PUBLICATIONS

Butt, Muhammad Akmal and Maragos, Pertos “Optimum Design of Chamfer Distance Transforms” IEEE Transactions on Image Processing vol. 7, No. 10, pp. 1477-1484,(Oct. 1998).*

Horng J-H et al: “Vehicle Path Planning by Using Adaptive Constrained Distance Transformation”; Pattern Recognition, Elsevier, Kidlington, GB, vol. 35, No. 6, (Jun. 2002), pp. 1327-1337, XP004341798; ISSN: 0031-3203.

Gunilla Borgefors; “Distance Transformation in Digital Images”; Computer Vision, Graphics and Image Processing; vol. 34, pp. 344-378 in Feb. 1986; XP000654507.

* cited by examiner

METHOD FOR LOCATING DIFFICULT ACCESS POINTS ON A MAP

BACKGROUND OF THE INVENTION

1. Field of the Invention

The present invention pertains to the locating of difficult access points, on a topological map plotted on the basis of a map of curvilinear distances.

2. Description of the Related Art

When dealing with a map of the zone overflown by an aircraft, plotted on the basis of a map of curvilinear distances taking account of the vertical flight profile of the aircraft, the difficult access points, which are those whose curvilinear distances greatly exceed the Euclidean distances, correspond to relief zones that are dangerous for the aircraft, the description dangerous applying to any relief zone that cannot be crossed directly by the aircraft starting from its current position having regard to its turning and climbing performance.

The applicant has already proposed, in a French patent application filed on Sep. 26, 2003, under no. 0311320, a method of estimating, on a map extracted from a terrain elevation database, curvilinear distances separating the points of the map, from a reference point taken as origin of the distances having regard to obstacles to be detoured around, the contours of which may change in the course of the time of traversal of the curvilinear distances as is the case for an aircraft whose current position corresponds to that of the point taken as origin of the measurements of the distances and which has to comply with a vertical flight profile with variations in altitude implying that one and the same relief that is threatening at a certain moment is no longer so at another or vice versa. This method implements a propagation-based distance transform also known by the name of chamfer mask distance transform since it uses a so-called "chamfer mask" array cataloging the approximate values of the Euclidean distances separating a point of the map from its nearest neighbors.

The array formed by the curvilinear distances estimated for the set of points of a map is called, for convenience, a map of curvilinear distances. It is not particularly intended to be displayed but rather to serve in the plotting of maps to be displayed showing certain specifics of the relief.

In the case of an aircraft, the map of curvilinear distances relates to the region overflown and has, as reference point taken as origin of the measurements of the curvilinear distances, a point near the current position of the aircraft. It serves for the plotting of a map, often in two dimensions, which is displayed on the instrument panel and shows, in false colors, a split of the region overflown into zones delimited as a function of the capacity of the aircraft to cross them and of the time that the latter would take to reach them when they are crossable, for example red for uncrossable reliefs, no route being possible, yellow for reliefs that are far away or close in the sense of the Euclidean distance but are only crossable by a diverted route and green for reliefs that are close in the sense of the Euclidean distance, and are crossable by a direct route.

A map of the relief overflown, established on the basis of a map of curvilinear distances has the drawback of not giving very explicit information on the importance of the diversion to be accomplished when it is necessary to make one, thereby prompting us to understate, through caution, the zones represented in yellow in favor of those represented in red.

It is possible to obtain this information on the importance of the diversion to be accomplished, on the basis of the calculation of the Euclidean distances and of their comparisons with the curvilinear distances but account has to be taken in these comparisons of the presence of the obstacles to be detoured around and this leads to a considerable increase in the calculations required for the plotting of the map displayed.

SUMMARY OF THE INVENTION

The purpose of the present invention is to overcome this drawback, by depicting, on a relief map, established on the basis of a map of curvilinear distances, graphical information on the importance of the diversion required to access a point and hence, for an aircraft, on the dangerousness of the relief at this point, without however calling explicitly upon the calculation of the Euclidean distances.

According to the invention, a method of locating difficult access points on a topological map established on the basis of a map of curvilinear distances, is noteworthy in that the map of curvilinear distances is analyzed by means of a chamfer mask cataloging the approximate values of the Euclidean distances separating a point of the map from its nearest neighbors, so as to extract therefrom, at each point of the map of curvilinear distances, the discrepancies of curvilinear distances separating the point considered from its nearest neighbors, compare these discrepancies with the approximate values of the Euclidean distances of the chamfer mask and describe the point considered as difficult of access when a difference appears.

According to one aspect of the invention, the difference noted is compared with several thresholds so as to devise degrees in the description as difficult of access.

According to another aspect of the invention, the points of the map of curvilinear distances that are regarded as difficult of access are located on the topological map established on the basis of the map of curvilinear distances by a pattern and/or a particular texture.

According to another aspect of the invention, when several comparison thresholds are used to devise degrees in the description as difficult of access, these degrees are evidenced on the topological map by different patterns and/or textures.

According to another aspect of the invention, the chamfer mask used for the locating of the difficult access points is of dimension 3×3.

According to another aspect of the invention, the chamfer mask used for the locating of the difficult access points is of dimension 5×5.

BRIEF DESCRIPTION OF THE DRAWINGS

Other characteristics and advantages of the invention will emerge from the description below, of an exemplary embodiment. This description will be offered in conjunction with the drawing in which.

a FIG. 1 represents an exemplary map of curvilinear distances covering a zone in which a craft is deploying and having the position of the craft as origin of the distance measurements, a FIG. 2 represents an exemplary chamfer mask usable by a propagation-based distance transform.

DETAILED DESCRIPTION OF THE EMBODIMENTS

Figure 1:
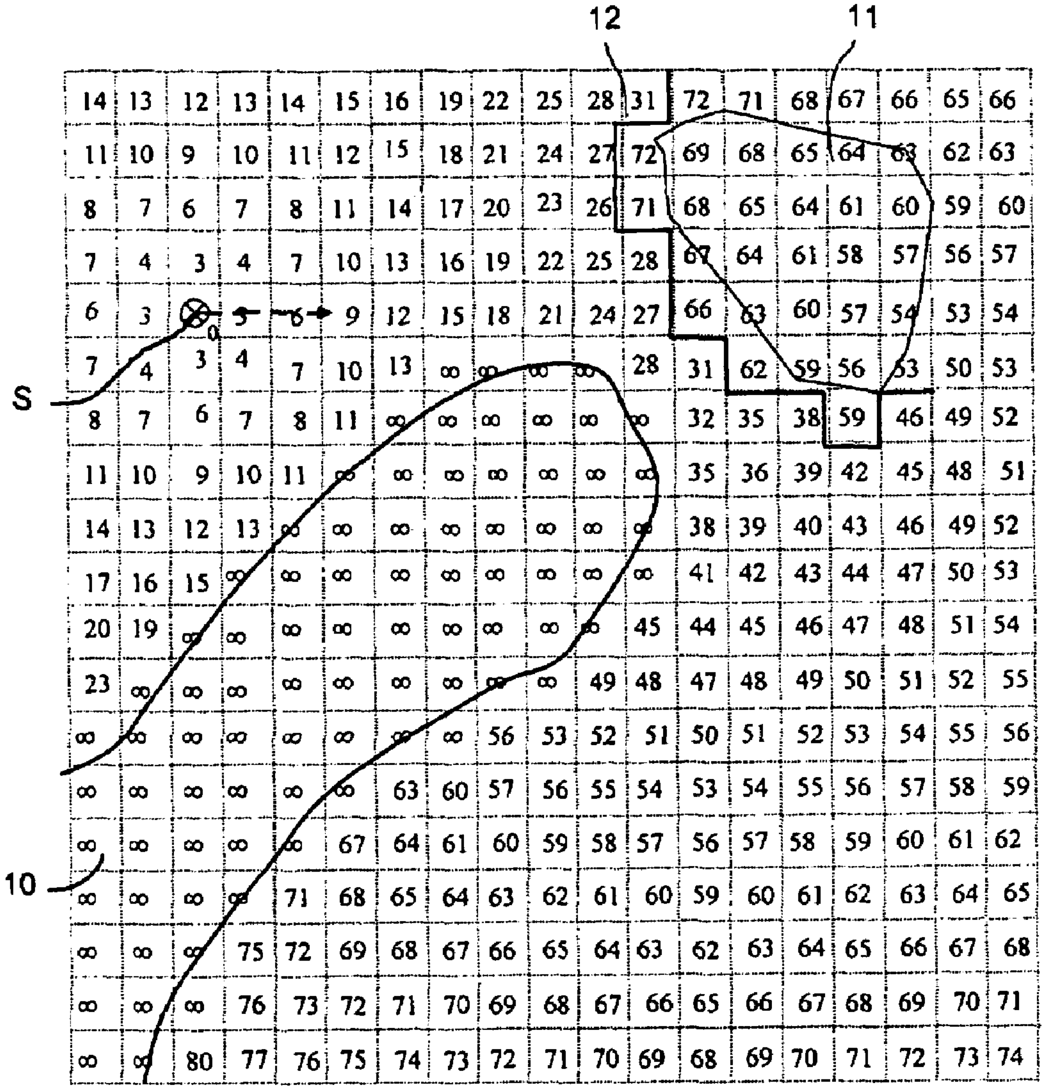

A map of distances over a zone of deployment is made up of the whole set of values of the distances of the points placed at the nodes of a regular mesh of the zone of deployment with respect to a point of the zone, taken as origin of the distance measurements. As shown in FIG. 1, it may be presented in the form of an array of values whose boxes correspond to a splitting of the zone of deployment into cells centered on the nodes of the mesh. The regular mesh adopted is often that of the points of a terrain elevation database covering the zone of deployment. When a map of distances is used for the navigation of a craft, the zone point taken as origin of the distance measurements is the node of the mesh closest to the projection on the ground of the instantaneous position of the craft.

Maps of distances are often produced using a propagation-based distance transform also known as a chamfer mask distance transform.

Chamfer mask distance transforms appeared initially in image analysis to estimate distances between objects. Gunilla Borgefors describes examples thereof in her article entitled "Distance Transformation in Digital Images" published in the journal: Computer Vision, Graphics and Image Processing, vol. 34, pp. 344-378 in February 1986.

The distance between two points of a surface is the minimum length of all the possible routes over the surface starting from one of the points and finishing at the other. In an image formed of pixels distributed according to a regular mesh of rows, columns and diagonals, a propagation-based distance transform estimates the distance of a pixel termed "goal" pixel with respect to a pixel termed "source" pixel by constructing progressively, starting from the source pixel, the shortest possible path following the mesh of pixels and finishing at the goal pixel, being aided by the distances found for the image pixels already analyzed and an array termed a chamfer mask cataloging the values of the distances between a pixel and its close neighbors.

Figure 2:
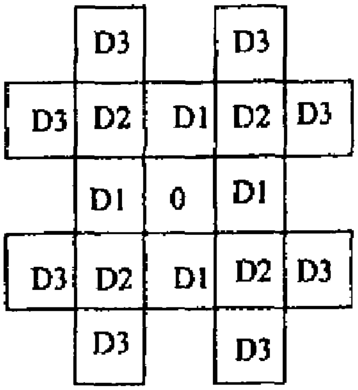
FIG.2 PRIOR ART

As shown in FIG. 2, a chamfer mask takes the form of an array with an arrangement of boxes reproducing the pattern of a pixel surrounded by its close neighbors. At the center of the pattern, a box assigned the value 0 labels the pixel taken as origin of the distances cataloged in the array. Around this central box are clustered peripheral boxes filled with non-zero proximity distance values and mimicking the arrangement of the pixels of the neighborhood of a pixel assumed to occupy the central box. The proximity distance value appearing in a peripheral box is that of the distance separating a pixel occupying the position of the peripheral box concerned, from a pixel occupying the position of the central box. It is noted that the proximity distance values are distributed as concentric circles. A first circle of four boxes corresponding to the four pixels of first rank that are closest to the pixel of the central box that are placed either on the same row or on the same column are assigned a proximity distance value D1. A second circle of four boxes corresponding to the four pixels of second rank that are the pixels closest to the pixel of the central box that are placed on the diagonals are assigned a proximity distance value D2. A third circle of eight boxes corresponding to the eight pixels of third rank that are closest to the pixel of the central box while yet remaining outside the row, the column and the diagonals occupied by the pixel of the central box are assigned a proximity distance value D3.

The chamfer mask can cover a neighborhood of greater or lesser extent of the pixel of the central box by cataloging the values of the proximity distances of a greater or lesser number of concentric circles of pixels of the neighborhood. It may be reduced to the first two circles formed by the pixels of the neighborhood of a pixel occupying the central box as in the exemplary distance maps of FIG. 1 or be extended beyond the first three circles formed by the pixels of the neighborhood of the pixel of the central box. It is customary to stop at first three circles as for the chamfer mask shown in FIG. 2. It is only for the sake of simplification that one stops at the first two circles for the map of distances of FIG. 1.

The values of the proximity distances D1, D2, D3 which correspond to Euclidean distances are expressed in a scale whose multiplicative factor permits the use of integers at the cost of a certain approximation. Thus, G. Borgefors adopts a scale corresponding to a multiplicative factor of 3 or 5. In the case of a chamfer mask retaining the first two circles of values of proximity distance, hence of dimensions 3×3, G. Borgefors gives the value 3 to the first proximity distance D1 which corresponds to an echelon in abscissa or in ordinates and also to the scale multiplicative factor, and the value 4 to the second proximity distance which corresponds to the root of the sum of the squares of the echelons with abscissa and with ordinate $\sqrt{x^2+y^2}$. In the case of a chamfer mask retaining the first three circles, hence of dimensions 5×5, she gives the value 7, which is an approximation of $5\sqrt{2}$ to the distance D1 which corresponds to the scale multiplicative factor, and the value 11, which is an approximation of $5\sqrt{5}$, to the distance D3.

The progressive construction of the shortest possible path going to a goal pixel, starting from a source pixel and following the mesh of pixels is done by regular scanning of the pixels of the image by means of the chamfer mask.

Initially, the pixels of the image are assigned an infinite distance value, in fact a number high enough to exceed all the values of the distances that are measurable in the image, with the exception of the source pixel which is assigned a zero distance value. Then the initial distance values assigned to the goal points are updated in the course of the scan of the image by the chamfer mask, an update consisting in replacing a distance value allocated to a goal point with a new lesser value resulting from a distance estimate made on the occasion of a new application of the chamfer mask to the goal point considered.

An estimation of distance by application of the chamfer mask to a goal pixel consists in cataloging all the paths going from this goal pixel to the source pixel and passing through a pixel of the neighborhood of the goal pixel whose distance has already been estimated in the course of the same scan, in searching from among the paths cataloged for the shortest path or paths and in adopting the length of the shortest path or paths as distance estimate. This is done by placing the goal pixel whose distance it is desired to estimate in the central box of the chamfer mask, while selecting the peripheral boxes of the chamfer mask corresponding to pixels of the neighborhood whose distance has just been updated, while calculating the lengths of the shortest paths connecting the pixel to be updated to the source pixel while passing through one of the selected pixels of the neighborhood, by addition of the distance value assigned to the pixel of the neighborhood concerned and of the proximity distance value given by the chamfer mask, and in adopting, as distance estimate, the minimum of the path length values obtained and of the old distance value assigned to the pixel undergoing analysis.

At the level of a pixel under analysis by the chamfer mask, the progressive search for the shortest possible paths starting from a source pixel and going to the various goal pixels of the image gives rise to a phenomenon of propagation in directions of the pixels which are the nearest neighbors of the pixel under analysis and whose distances are cataloged in the chamfer mask. In the case of a regular distribution of the pixels of the image, the directions of the nearest neighbors of a pixel not varying are considered as propagation axes of the chamfer mask distance transform.

The order of scanning of the pixels of the image influences the reliability of the distance estimates and of their updates since the paths taken into account depend thereon. In fact, it is subject to a regularity constraint which implies that if the pixels of the image are labeled in lexicographic order (pixels ranked in row-by-row ascending order starting from the top of the image and progressing toward the bottom of the image, and from left to right within a row), and if a pixel p has been analyzed before a pixel q then a pixel p+x must be analyzed before the pixel q+x. The lexicographic order, inverse lexicographic order (scanning of the pixels of the image row-by-row from bottom to top and, within a row, from right to left), transposed lexicographic order (scanning of the pixels of the image column-by-column from left to right and, within a column, from top to bottom), inverse transposed lexicographic order (scanning of the pixels by columns from right to left and, within a column, from bottom to top) satisfy this regularity condition and more generally all scans in which the rows and columns are scanned from right to left or from left to right. G. Borgefors advocates a double scan of the pixels of the image, once in lexicographic order and another time in inverse lexicographic order.

Figure 3A:
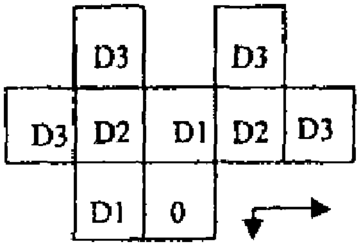
FIG.3a PRIOR ART
FIGS. 3*a* and 3*b* show the cells of the chamfer mask illustrated in FIG. 2, which are used in a scan pass in lexicographic order and in a scan pass in inverse lexicographic order, a FIG. 4 illustrates the concept of direct trajectory for an aircraft.

FIG. 3*a* shows, in the case of a scan pass in lexicographic order going from the upper left corner to the lower right corner of the image, the boxes of the chamfer mask of FIG. 2 that are used to catalog the paths going from a goal pixel placed on the central box (box indexed by 0) to the source pixel, passing through a pixel of the neighborhood whose distance has already formed the subject of an estimate in the course of the same scan. These boxes are eight in number, arranged in the upper left part of the chamfer mask. There are therefore eight paths cataloged for the search for the shortest whose length is taken as estimate of the distance.

Figure 3B:
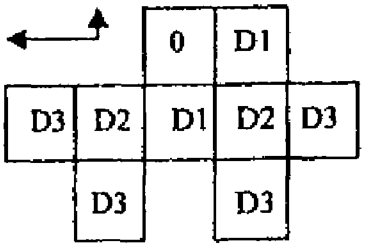
FIG.3b PRIOR ART

FIG. 3*b* shows, in the case of a scan pass in inverse lexicographic order going from the lower right corner to the upper left corner of the image, the boxes of the chamfer mask of FIG. 2 that are used to catalog the paths going from a goal pixel placed on the central box (box indexed by 0) to the source pixel, passing through a pixel of the neighborhood whose distance has already formed the subject of an estimate in the course of the same scan. These boxes are complementary to those of FIG. 3*a*. They are also eight in number but arranged in the lower right part of the chamfer mask. There are therefore eight paths cataloged for the search for the shortest whose length is taken as estimate of the distance.

The propagation-based distance transform whose principle has just been recalled briefly was designed originally for the analysis of the positioning of objects in an image but it was soon applied to the estimation of the distances on a relief map extracted from a terrain elevation database with regular meshing of the terrestrial surface. Specifically, such a map is not furnished explicitly with a metric since it is plotted on the basis of the altitudes of the points of the mesh of the terrain elevation database of the zone represented. In this context, the propagation-based distance transform is applied to an image whose pixels are the elements of the terrain elevation database belonging to the map, that is to say, altitude values associated with the latitude, longitude geographical coordinates of the nodes of the mesh where they have been measured, ranked, as on the map, by increasing or decreasing latitude and longitude according to an array with two coordinate dimensions, latitude and longitude.

For terrain navigation of mobile objects such as robots, the chamfer mask distance transform is used to estimate curvilinear distances taking account of zones which are uncrossable because of their craggy configurations. To do this, a forbidden-zone marker is associated with the elements of the terrain elevation database featuring in the map. It signals, when it is activated, an uncrossable or forbidden zone and prohibits any update other than an initialization, of the distance estimation made by the chamfer mask distance transform.

In the case of an aircraft, the configuration of the uncrossable zones evolves as a function of the altitude imposed thereon by the vertical profile of the trajectory adopted in its flight plan. During the formulation of a map of curvilinear distances covering the region overflown, this is manifested as an evolution of the configuration of the uncrossable zones during the plotting of the shortest routes whose lengths serve as estimations for the curvilinear distances. This evolution, during the plotting, of the configuration of the uncrossable zones may lead to sizeable discrepancies between the estimations of curvilinear distances made for geographically close points.

Figure 4:
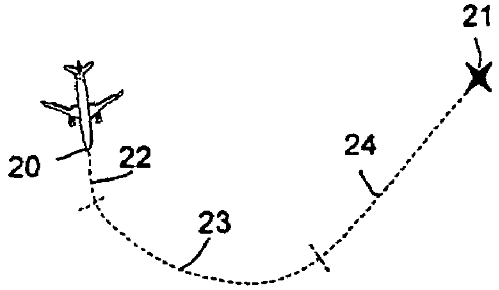

To understand this phenomenon, it is necessary to recall the concept of the shortest trajectory for an aircraft. As shown in FIG. 4, a shortest trajectory for an aircraft seeking to reach, from its current position 20, an aim point 21, consists, in the horizontal plane:

- of a rectilinear segment 22 related to the inertia of the aircraft, when banking into a turn so as to steer toward the aim point 21,
- of an arc of a cycloid 23 corresponding to the turning of the aircraft pushed by the crosswind until it reaches the azimuth of the aim point, and
- of a rectilinear segment 24 between the exit from the turn and the aim point 21.

In the vertical plane, the shortest trajectory is contingent on the climb and descent capabilities of aircraft as well on the imposed altitudes.

Certain reliefs that cannot be crossed by a shortest trajectory can nevertheless be crossed by a detour trajectory. FIGS. 5*a*, 5*b* and 6*a*, 6*b* give an example thereof.

Figure 5A:
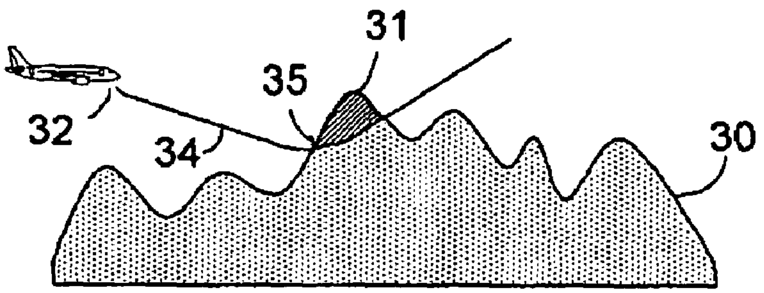
FIGS. 5*a*, 5*b* and 6*a*, 6*b* illustrate, as vertical and horizontal projections, a flight situation in which a relief constitutes an obstacle uncrossable by the shortest trajectory but crossable by a detour trajectory, a FIG. 7 shows the flight profile adopted for the map of curvilinear distances, shown in FIG. 1, a FIG. 8 shows the vertical and horizontal profiles of a relief configuration corresponding to a particular zone of the map of curvilinear distances of FIG. 1, exhibiting a partially uncrossable edge (11), a FIG. 9 shows an indexation used for the individual locating of the elements of the chamfer mask of FIG. 2, and a FIG. 10 is a logic chart illustrating the main steps of an analysis, done in a method of locating according to the invention, by means of a chamfer mask.
Figure 5B:
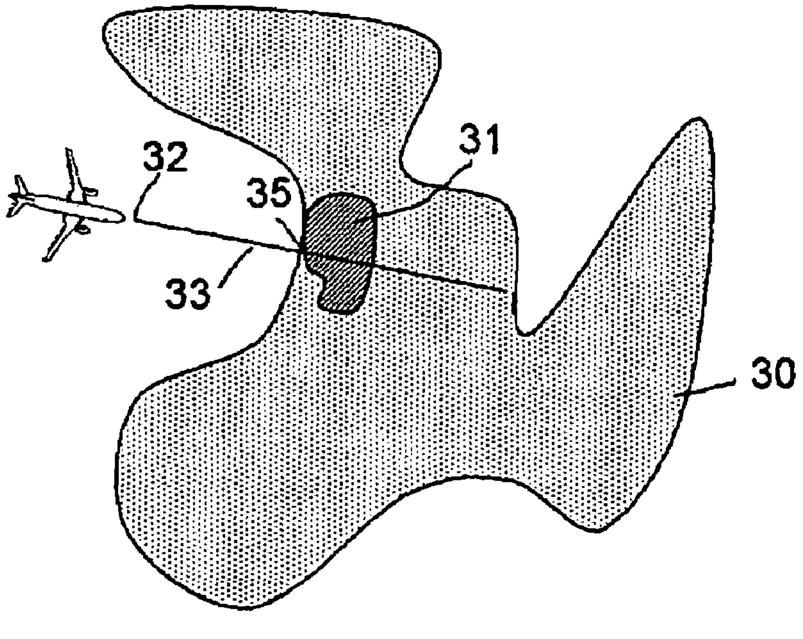
Figure 6A:
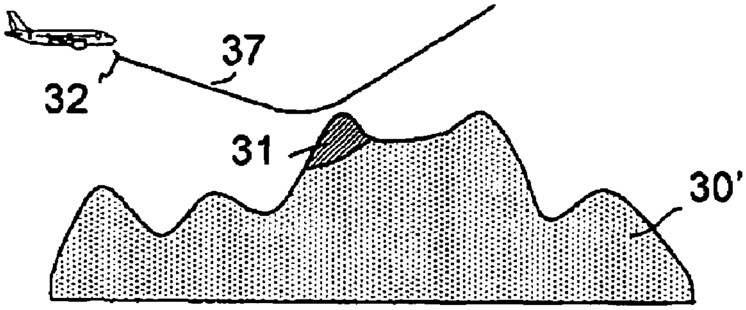
Figure 6B:
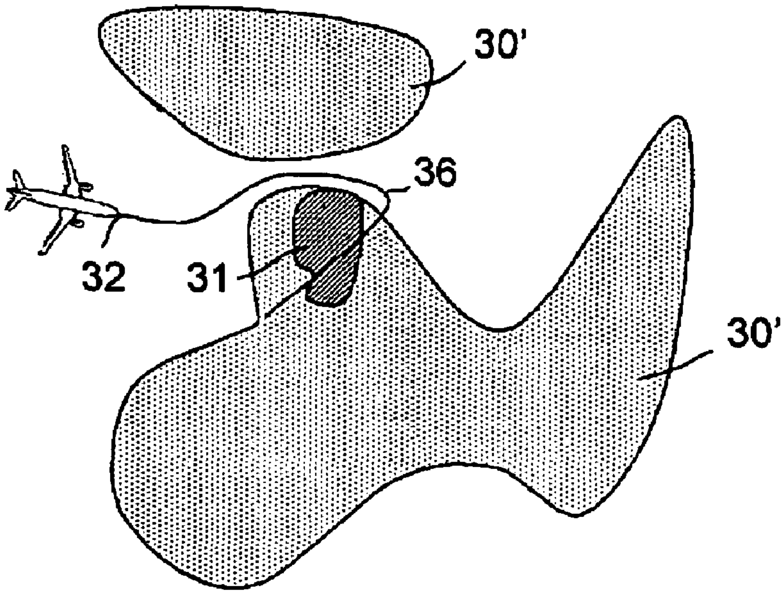

The same relief is shown in vertical cross sections, according to the profile of the shortest trajectory in FIG. 5*a* and according to the profile of a detour trajectory in FIG. 6*a*, and in horizontal projections in FIGS. 5*b* and 6*a*, under the guise of two strata 30, 31 or 30', 31. FIGS. 5*a* and 5*b* show an aircraft in a current position 32 such that its shortest trajectory, located by its horizontal projection 33 and vertical projection 34, intercepts the relief at 35 at the common boundary of the strata 30, 31. FIGS. 6*a* and 6*b* show that the aircraft, in the same current position 32 and in the same flight configuration, nevertheless has a possibility of crossing the relief illustrated by a first stratum 30' that is higher than previously 30 and by the same second stratum 31, by following a detour trajectory shown in horizontal projection 36 and in vertical projection 37.

Figure 7:
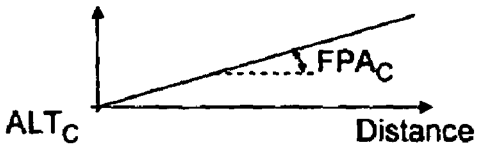

A map of curvilinear distances formulated with a view to aiding the navigation of an aircraft takes account at one and the same time of the uncrossable reliefs and of those only crossable by detour trajectories when, in the course of the estimations of the curvilinear distances, the configuration of the uncrossable zones is made to depend on the instantaneous altitude which would be reached by the aircraft along the various routes tested assuming that it complies with an imposed vertical flight profile corresponding for example to that of its flight plan. FIG. 1 gives a simplified example of such a map of curvilinear distances established for aiding the navigation of an aircraft having a vertical flight profile in accordance with that of FIG. 7, that is to say having a positive rate of climb $FPA_C$, as is the case for an aircraft after takeoff. It has been formulated with the aid of the simplest of the distance transforms proposed by Gunilla Borgefors using a chamfer mask of dimension 3×3 with two neighborhood distances 3, 4. The aircraft is assumed to be at the point S and to be moving in the sense of the arrow. The overfly zone covered exhibits two reliefs that are uncrossable by the aircraft, one 10 completely uncrossable and the other 11 only crossable by detour trajectories.

The fact that the first relief 10 is considered to be completely uncrossable amounts to admitting that the aircraft never reaches a sufficient altitude on the various routes tested for the estimations of curvilinear distances. Hence, its contour does not vary during the plotting of the various routes tested and its points keep the infinite value of curvilinear distance which was assigned to them on initialization.

Figure 8:
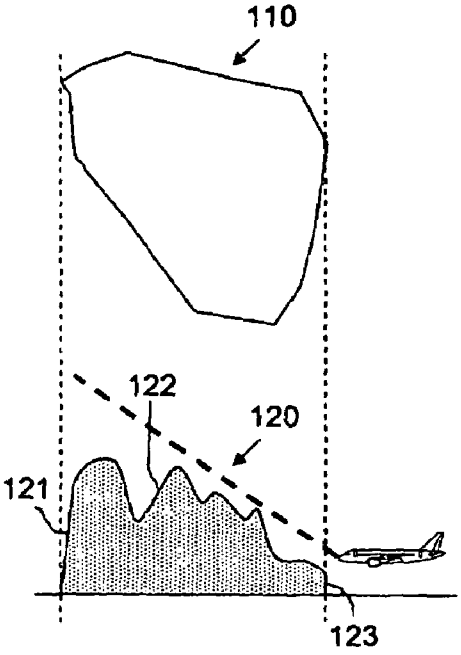

The second relief 11 is assumed to have the horizontal 110 and vertical 120 contours shown in FIG. 8. Its vertical profile 120 approximates that of a corner, with a high and sheer front edge 121, for example a line of cliffs, facing in the direction of the current position S of the aircraft and leading via a descending line of peaks 122 to a markedly lower rear edge 123. Its high front edge 121 facing toward the current position S of the aircraft is crossable only on condition that the aircraft has gained sufficient altitude. This is not the case for the shortest trajectory which follows the propagation axes of the chamfer mask transform having as origin the current position S of the aircraft and going in the directions of the front edge 121 of this second relief 11. On the other hand, the aircraft will have sufficient altitude to cross this second relief 11, if it has taken the time to detour round it via the rear. When traversing the shortest routes along the second relief 11, the contour of this second relief 11 narrows at the rear until it peters out so that the chamfer mask distance transform ends up finding routes that are practicable for all the points belonging to the second relief 11 which get assigned estimations of curvilinear distances that are lower than the initialization value.

A map of curvilinear distances such as that shown in FIG. 1 may serve as basis for the display of a map of the region overflown depicting lines of equal curvilinear distance forming a sort of rosette around the current position of the aircraft and totally uncrossable terrain contours. Through the deformations of the rosette formed by the lines of equal curvilinear distance, this map also depicts terrain outlines that are dangerous since they are uncrossable by a shortest trajectory but these deformations are difficult to interpret by looking at them.

In order to make these dangerous terrain outlines stand out better, although without undertaking complicated calculations, it is proposed that use be made of the discontinuities between curvilinear distances of neighboring points. The discontinuities of curvilinear distance between neighboring points are detected by scanning the points of the map of the curvilinear distances, by means of a chamfer mask cataloging the approximate values of the Euclidean distances separating a point of the map of curvilinear distances from its nearest neighbors. In the course of the scan, each point of the map of curvilinear distances is subjected to an analysis by the chamfer mask consisting in charting the discrepancies of curvilinear distances separating the point under analysis from its nearest neighbors, in comparing these discrepancies with the approximate values of the corresponding Euclidean distances of the chamfer mask and in describing the point under analysis as difficult of access when a difference is noted between Euclidean distances and discrepancies of curvilinear distances.

The chamfer mask used for the detection of the discontinuities of curvilinear distances between neighboring points can be of any dimensions. It is advantageously of dimensions 3×3 or 5×5.

Figure 9:
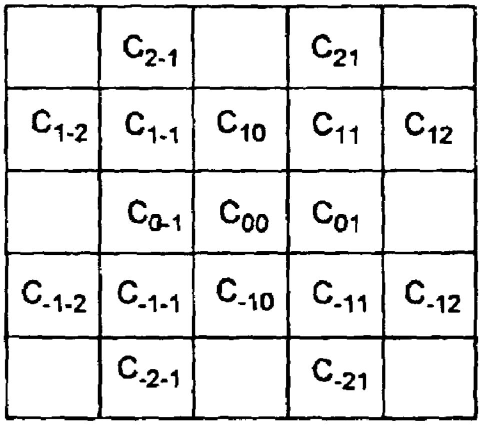

FIG. 9 shows the points of the neighborhood involved during an analysis by a chamfer mask of dimension 3×3. These points are the four neighbors $C_{0-1}$, $C_{01}$, $C_{-10}$, $C_{-10}$ nearest to the point under analysis $C_{00}$, either in the same row, or in the same column, the four neighbors $C_{-1-1}$, $C_{11}$, $C_{-11}$, $C_{1-1}$ nearest to the point under analysis $C_{00}$ of the two diagonals and the eight neighbors $C_{-1-2}$, $C_{-2-1}$, $C_{-21}$, $C_{-12}$, $C_{12}$, $C_{21}$, $C_{2-1}$, $C_{1-2}$ nearest to the point under analysis $C_{00}$ while yet remaining outside of its row, its column or its diagonals.

Figure 10:
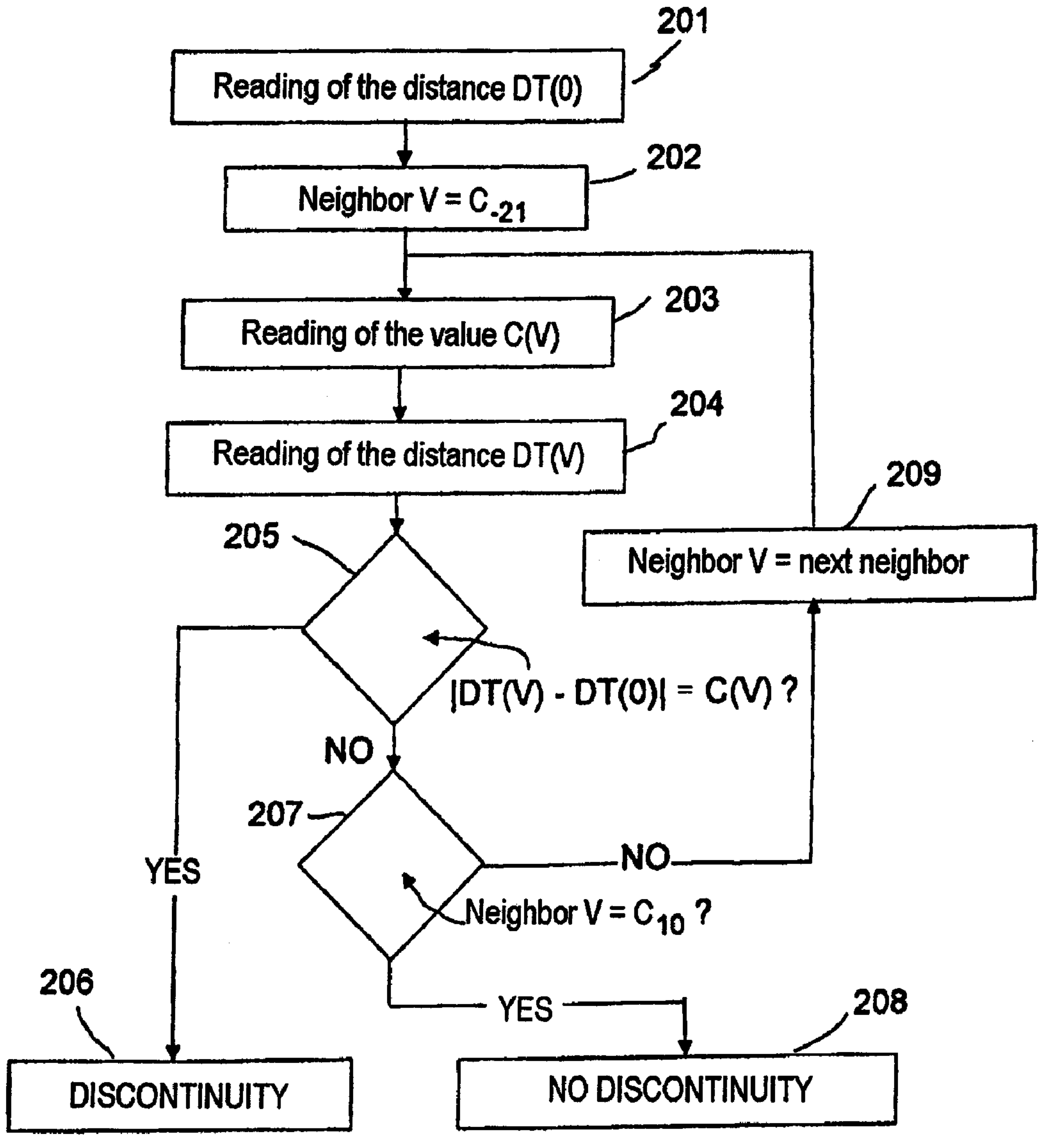

A way of undertaking the analysis of a point by the chamfer mask is illustrated by the logic flowchart of FIG. 10. The latter consists:

- in the course of a first step 201, in reading the estimated value DT(0) of the curvilinear distance assigned, in the map of curvilinear distances, to the point $C_{00}$ under analysis,
- in the course of a second step 202, in investigating a particular point V of the near neighborhood of the point $C_{00}$ under analysis, preferably a point at the periphery of the chamfer mask, for example the point $C_{-21}$,
- in the course of a third step 203, in reading the value C(V) of the Euclidean distance separating, according to the chamfer mask, the point V under investigation, from the point under analysis $C_{00}$,
- in the course of a fourth step 204, in reading the estimated value DT(V) of the curvilinear distance assigned, in the map of curvilinear distances, to the point V under investigation,
- in the course of a fifth step 205, in comparing the absolute value of the discrepancy between the estimated values DT(0) and DT(V) of the curvilinear distances read in the first 201 and fourth 204 steps with the value of Euclidean distance C(V) read in the third step 203 so as to note whether or not there is equality,
- in the course of a sixth step 206, in signaling a difficulty of access and changing the point $C_{00}$ under analysis if the comparison of the fourth step 204 culminates in noting an inequality,
- in the course of a seventh step 207 alternative to the sixth step 206 should equality be noted at the end of the fourth step 204, in testing whether all the points of the near neighborhood of the point $C_{00}$ undergoing analysis and cataloged in the chamfer mask have been investigated,
- in the course of an eighth step 208, in not detecting any discontinuity for the point analyzed C and in changing analyzed point $C_{00}$ if all the points V of its near neighborhood, that are cataloged in the chamfer mask, have been investigated,
- in the course of a ninth step 209, in changing investigated point V and in looping back to the third step 203 if all the points V of the near neighborhood of the point $C_{00}$ undergoing analysis, that are located in the chamfer mask, have not been investigated.

The test of end of investigation of all the points of the near neighborhood, that are cataloged by the chamfer mask performed in the seventh step 207, may be done on the maximum value of an auxiliary index for enumerating these points which may still be selected in turn, in the same order, commencing with the ones furthest away for which the probability of discontinuity is largest and ending with the ones that are nearest. This order of selection is for example, borrowing the indexation of FIG. 9: $C_{-21}$, $C_{-12}$, $C_{12}$, $C_{21}$, $C_{2-1}$, $C_{1-2}$, $C_{-1-2}$, $C_{-2-1}$, $C_{-1-1}$, $C_{-11}$, $C_{11}$, $C_{1-1}$, $C_{0-1}$, $C_{-10}$, $C_{01}$, $C_{10}$.

The signaling of a difficulty of access for a point of the map of curvilinear distances can be done by means of a difficulty of access pointer associated with the estimation of the curvilinear distance and used to modify the appearance of the points on the map displayed as a function of its activated or nonactivated state. The difficulty of access pointer can present several values corresponding to several values of thresholds for the discrepancies of estimations of curvilinear distance separating a point under analysis from its nearest neighbors so as to make it possible to display the importance of the detours required by differences of pattern and/or texture.

The analysis of discontinuity of curvilinear distances between neighboring points emphasizes the terrain edges that are inaccessible by a shortest trajectory such as the relief 11 in FIG. 1 which may be shown with a particular texture or pattern on the map displayed, for example overscoring as at 12 in FIG. 1. It also emphasizes the contours of the terrains that are totally inaccessible such as the relief 10 of FIG. 1 but this presents less interest, these terrains being easily locatable by the initialization value of the estimations of the curvilinear distances of their points.

The invention claimed is:

1. A method for locating difficult access points on a topological map using discontinuities between curvilinear distances of neighboring points, the method comprises the steps of:

scanning points on a map of curvilinear distances, using reliefs only crossable by detour trajectories;

reading estimated value DT(0) of the curvilinear distance assigned, in the map of curvilinear distances, to a point $C_{00}$ under analysis;

determining a Euclidean distance C(V) separating a point V under investigation, from the point $C_{00}$ under analysis using a chamfer mask distance transform;

determining an estimated value DT(V) of the curvilinear distance assigned, in the map of curvilinear distances, to the point V under investigation;

calculating an absolute value of any discrepancy between the estimated values of the curvilinear distances, DT(0) and DT(V), with the determined Euclidean distance C(V);

determining a difficulty of access of the point $C_{00}$ under analysis based upon an inequality of the absolute value calculated and the determined Euclidean distance C(V); and rendering a display of a map indicating difficult access points.

2. The method as claimed in claim 1, wherein determining a difficulty of access and transforming the point $C_{00}$ under analysis based upon an inequality of the absolute value calculated and the determined Euclidean distance C(V) includes using several thresholds to determine a degree of importance of a detour required to reach a difficult access point.

3. The method as claimed in claim 1, wherein the difficult access points of the map are established on the basis of the map of curvilinear distances by a pattern and/or a particular texture.

4. The method as claimed in claim 2, wherein the degrees in the importance of the detour required of a difficult access point are indicated on the topological map by different patterns and/or textures.

5. The method as claimed in claim 1, wherein the chamfer mask used for locating the difficult access points is of dimension 3×3.

6. The method as claimed in claim 1, wherein the chamfer mask used for locating the difficult access points is of dimension 5×5.

* * * * *